US007171459B2

(12) United States Patent
Sanghvi et al.

(10) Patent No.: US 7,171,459 B2
(45) Date of Patent: Jan. 30, 2007

(54) METHOD AND APPARATUS FOR HANDLING POLICIES IN AN ENTERPRISE

(75) Inventors: Ashvinkumar J. Sanghvi, Issaquah, WA (US); Howard M. Hance, Snohomish, WA (US); Lev Novik, Bellevue, WA (US); Fred E. Shaudys, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 646 days.

(21) Appl. No.: 09/875,814

(22) Filed: Jun. 5, 2001

(65) Prior Publication Data

US 2002/0059471 A1    May 16, 2002

Related U.S. Application Data

(60) Provisional application No. 60/210,347, filed on Jun. 7, 2000.

(51) Int. Cl.
*G06F 15/173* (2006.01)
(52) U.S. Cl. ................. 709/223; 709/226; 709/220
(58) Field of Classification Search ........... 709/205, 709/220–226, 330, 238; 719/318; 707/10
See application file for complete search history.

(56) References Cited

U.S. PATENT DOCUMENTS

| 5,655,081 | A | | 8/1997 | Bonnell et al. |
| 5,724,589 | A | | 3/1998 | Wold |
| 5,872,928 | A | * | 2/1999 | Lewis et al. ............... 709/222 |
| 5,889,953 | A | * | 3/1999 | Thebaut et al. ............ 709/221 |
| 6,058,416 | A | | 5/2000 | Mukherjee et al. |
| 6,154,849 | A | * | 11/2000 | Xia ............................. 714/4 |
| 6,195,685 | B1 | * | 2/2001 | Mukherjee et al. ......... 709/205 |
| 6,243,747 | B1 | * | 6/2001 | Lewis et al. ............... 709/220 |
| 6,269,473 | B1 | * | 7/2001 | Freed et al. ................ 717/104 |
| 6,275,232 | B1 | | 8/2001 | Cataudella et al. |
| 6,381,639 | B1 | * | 4/2002 | Thebaut et al. ............ 709/222 |
| 6,466,932 | B1 | * | 10/2002 | Dennis et al. ............... 707/3 |
| 6,470,384 | B1 | | 10/2002 | O'Brien et al. |
| 6,473,851 | B1 | * | 10/2002 | Plutowski ..................... 713/1 |
| 6,584,502 | B1 | * | 6/2003 | Natarajan et al. .......... 709/224 |
| 6,678,835 | B1 | * | 1/2004 | Shah et al. ................... 714/4 |
| 6,708,187 | B1 | | 3/2004 | Shanumgam et al. |

(Continued)

OTHER PUBLICATIONS

Windows 2000 Active Directory by Alistair G. Lowe-Norris, published by O'Riely, 1st edition Jan. 2000.*

(Continued)

*Primary Examiner*—John Follansbee
*Assistant Examiner*—Mohammad Siddiqi
(74) *Attorney, Agent, or Firm*—Lee & Hayes, PLLC

(57) ABSTRACT

An event-handling system identifies multiple policies to be combined together in a merged policy set. The system determines whether any conflicts exist between the multiple policies. Any non-conflicting policies are included in the merged policy set. The system resolves conflicting policies by selecting a preferred policy and including the preferred policy in the merged policy set. The preferred policy is selected by arranging conflicting policy templates in order from global policies to local policies and determining the intersection of the conflicting policy templates. The preferred policy template is selected based on the policy template closest to the local policies and within the intersection of the conflicting policy templates.

23 Claims, 9 Drawing Sheets

U.S. PATENT DOCUMENTS

| | | | |
|---|---|---|---|
| 6,748,455 B1 | 6/2004 | Hinson et al. | |
| 6,766,368 B1 | 7/2004 | Jakobson et al. | |
| 6,799,208 B1* | 9/2004 | Sankaranarayan et al. | 709/223 |
| 6,826,698 B1* | 11/2004 | Minkin et al. | 713/201 |
| 6,829,770 B1 | 12/2004 | Hinson et al. | |
| 6,865,549 B1* | 3/2005 | Connor | 705/51 |
| 2001/0049086 A1 | 12/2001 | Paquette et al. | |
| 2002/0016840 A1* | 2/2002 | Herzog et al. | 709/225 |
| 2005/0044554 A1 | 2/2005 | Hinson et al. | |
| 2005/0071849 A1 | 3/2005 | Hinson et al. | |

OTHER PUBLICATIONS

☐☐Troubleshooting Group Policy in Windows 2000, Published by Microsoft Corporation, published on Feb. 2001.*

Abstract for "Integrated Network Management VI. Distributed Management for the Networked Millennium", Proceedings of the Sixth IFIP/IEEE International Symposium on Integrated Network Management, May 24-28, 1999.

Abstract for "Applying configurable event-triggered services in heterogeneous, distributed information systems", Koschel et al., Proceedings of EFIS '99: Second International Workshop on Engineering Federated Information Systems, May 5-7, 1999, pp. 147-157.

"CIM II: The Integrated Enterprise", Lopes, P., Society of Manufacturing Engineers, Technical Paper, MS92-322, 1992, pp. 21-1 to 21-5, and 21-7.

"A geographically distributed enterprise simulation system", Ammerlahn et al., Future Generation Computer Systems 17, 2000, pp. 135-146.

"Hot Topics in Network Management", Malek, M., NOMS 2000, 2000 IEEE/IFIP Networks Operations and Management Symposium, 2000, 2 pages.

"Systems Management Software", Bloor Research, Software World, vol. 29, No. 3, 2 pages.

"Business rules", Odell, J., Object Magazine, Jan. 1995, pp. 53-56.

"Integration of Simulation with Enterprise Models", Srinivasan et al., Proceedings of the 1997 Winter Simulation Conference, pp. 1352-1356.

"A Process Oriented Method for the Reuse of CIM Models", Janusz, B., IFAC Manufacturing Systems: Modelling, Management and Control, 1997, pp. 219-224.

"Simulation of Business Processes in an Enterprise Modelling System", Pardasani et al., Proceedings of the SCSC, Jul. 24-26, 1995, pp. 440-445.

"A Messaging-Based Architecture for Enterprise Application Integration", Joseph, T., IEEE, Proceedings of the 15th International Conference on Data Engineering, Mar. 23-26, 1999, pp. 62-63.

"Bespa: a Event-based Mediation Mechanism for Systems Collaboration", Kajihara et al., NTT Software Laboratories, NTT R&D, vol. 46, No. 6, 1997, pp. 45-50.

"SMS: A Desktop Manager for the Enterprise?", Corcoran, C., Datamation, Mar. 15, 1996, pp. 71-72.

"Process-based Definition of Enterprise Models", Burkhart, R., Enterprise Integration Modeling, Proceedings of the First International Conference, 1992, pp. 229-238.

* cited by examiner

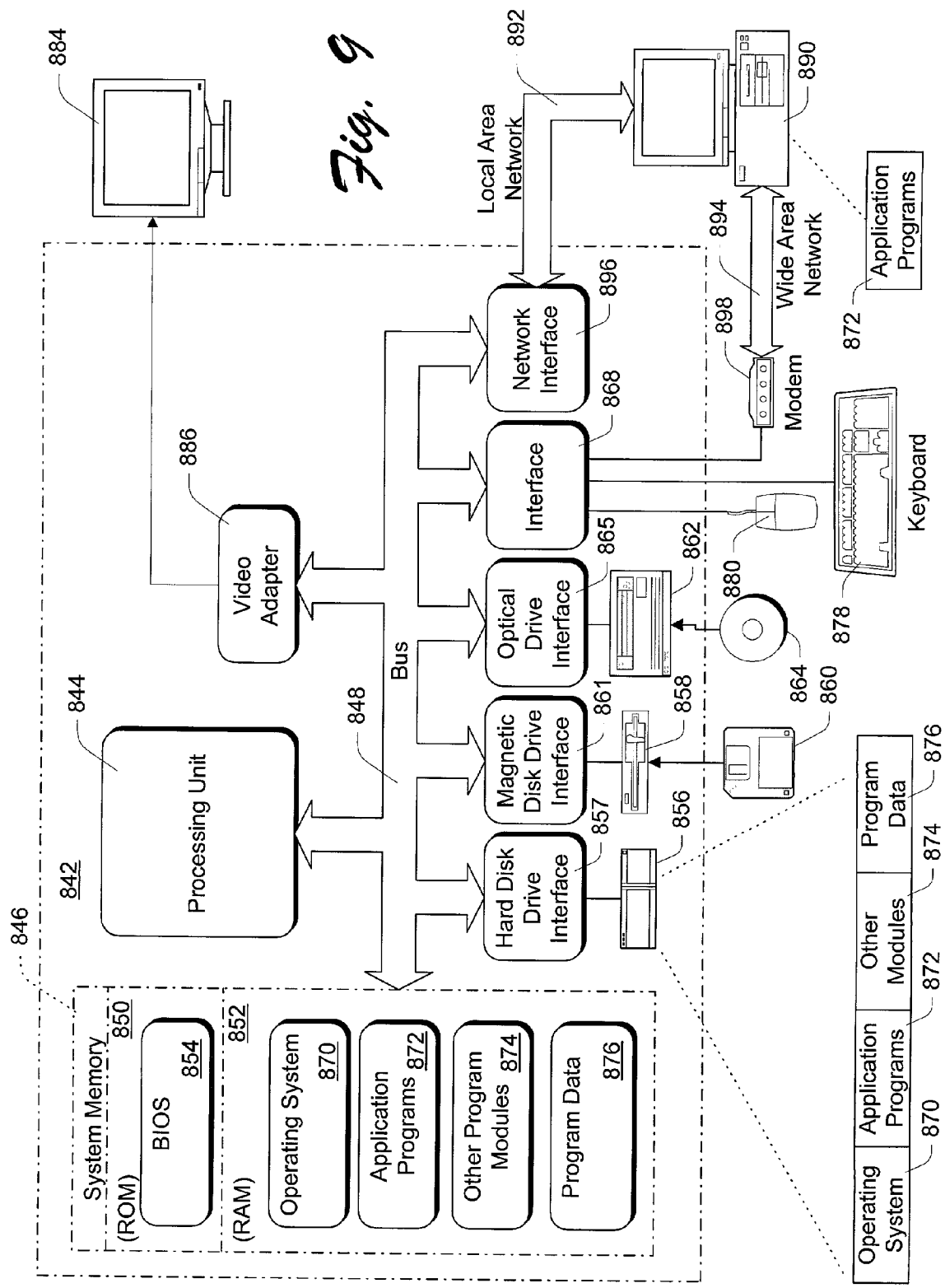

METHOD AND APPARATUS FOR HANDLING POLICIES IN AN ENTERPRISE

RELATED APPLICATIONS

This application claims the benefit of U.S. Provisional Application No. 60/210,347, filed Jun. 7, 2000.

TECHNICAL FIELD

The present invention relates to computing systems and, more particularly, to the handling of events generated by components, services and applications in a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

Existing operating system components, services, and applications generate events having a variety of different formats. Typically, the events are stored in different files or databases (e.g., a file or database on the local system). These stored events are accessed via different application programs using different application programming interfaces (APIs). Thus, to retrieve event data in this type of system, an application program must know where to locate the stored event data and how to read or "decode" the particular event data. Each time a new type of event (e.g., having a new storage location, a new format, and/or a new API) is introduced, each application program that desires the new event data must be adapted to locate and retrieve the new event data.

The systems and methods described herein address these limitations by providing a centralized mechanism for collecting and storing event data. The system and method also provide a uniform event-handling process and infrastructure.

SUMMARY

The event-handling systems and methods described herein provide a centralized architecture and procedure for managing event data. The centralized handling of event data uses a common interface to access event data, regardless of the event source, event data format, network topology or security mechanisms contained in the enterprise. Additional event sources can be added to the enterprise without requiring changes to the event-handling system. The event-handling system is also capable of merging together multiple policies into a single merged policy set.

In one embodiment, the system identifies multiple policies to be combined together and determines whether any conflicts exist between the multiple policies. Non-conflicting policies are included in a merged policy set. Conflicting policies are resolved by selecting a preferred policy and including the preferred policy in the merged policy set.

In a described embodiment, the preferred policy is selected by arranging conflicting policy templates in order from global policies to local policies and determining the intersection of the conflicting policy templates. The preferred policy template is selected based on the policy template closest to the local policies and within the intersection of the conflicting policy templates.

In a described implementation, the policies identify the types of events that are provided to each device.

In one embodiment, resolving conflicting policies includes comparing related policies individually.

BRIEF DESCRIPTION OF THE DRAWINGS

FIG. 9 illustrates an example of a suitable operating environment in which the event-handling system and method may be implemented.

DETAILED DESCRIPTION

Figure 1:
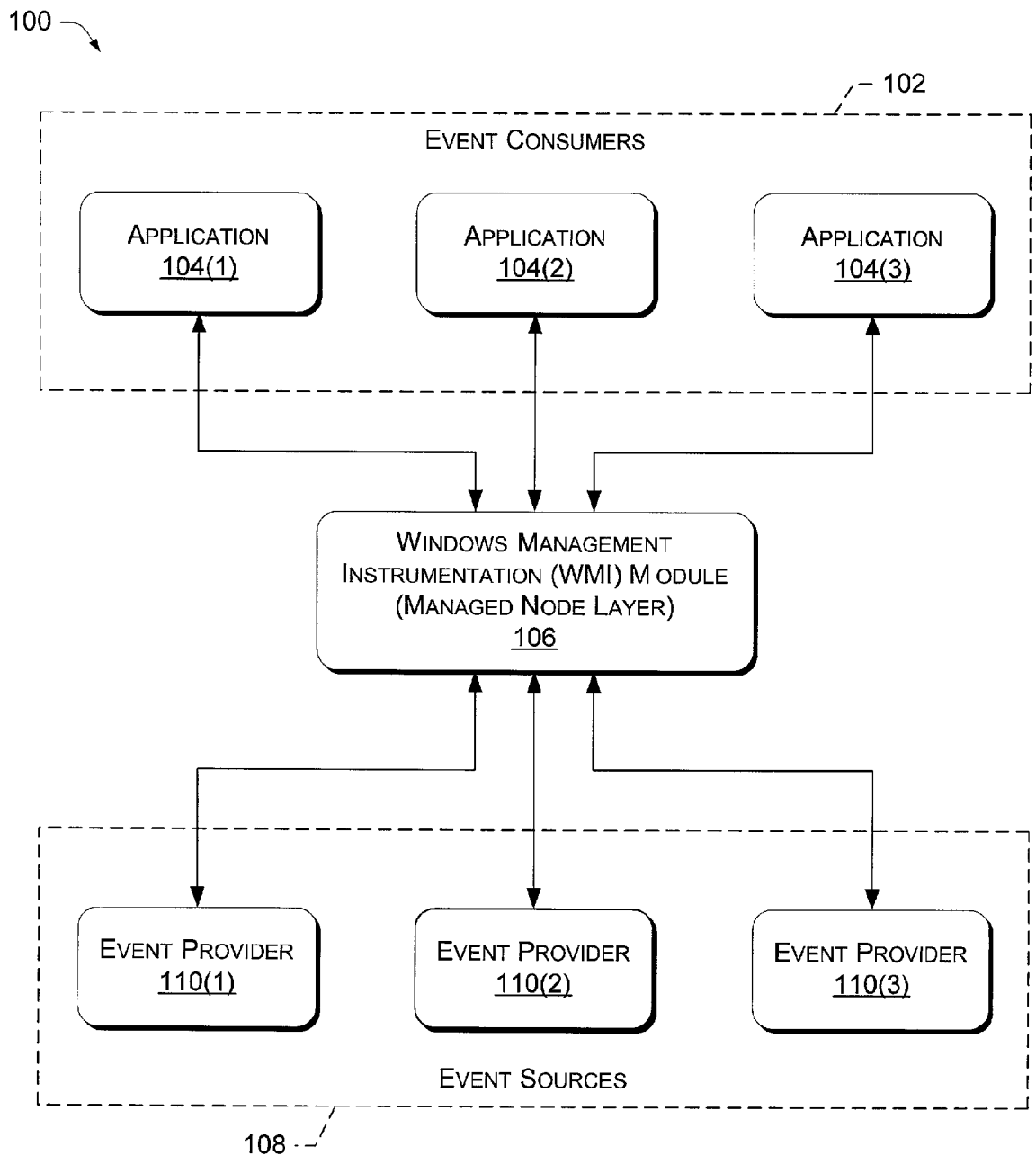
FIG. 1 illustrates a block diagram of a system that receives event information from multiple event providers and provides event information to multiple event consumers.

The systems and methods described herein provide for the centralized handling of event data generated by various event sources in an enterprise. The use of a common data format, a centralized event data storage device, and a common interface to obtain event data improves access to the event data and reduces administrative tasks associated with the handling of event data generated throughout the enterprise. The same event data format is used regardless of the source of the event data (also referred to as an event provider) or the users of the event data (also referred to as an event consumer). As the systems, applications, and topology of the enterprise changes, the event data format remains unchanged.

Web-Based Enterprise Management (WBEM) provides uniform access to management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is implemented using Windows Management Instrumentation (WMI) developed by Microsoft Corporation of Redmond, Wash., which provides an infrastructure to handle various events generated by event sources throughout an enterprise. WMI is Microsoft Corporation's implementation of WBEM.

WMI technology enables systems, applications, networks, and other managed components to be represented using the Common Information Model (CIM) designed by the Distributed Management Task Force (DMTF). CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single programming interface.

WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and methods, which describe the behavior of the class.

WMI classes describe managed objects that are independent of a particular implementation or technology. WMI includes an eventing subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

FIG. 1 illustrates a block diagram of a system 100 that receives event information from multiple event providers 108 (i.e., event sources) and provides event information to multiple event consumers 102 (i.e., the users of the event data). System 100 includes a WMI module 106, which receives event data from multiple event sources 108 and receives requests for information (e.g., notification of particular events) from multiple event consumers 102. Event sources 108 may include, for example, managed nodes or managed systems in a network. The multiple event sources are identified as event providers 110. The multiple event consumers are identified as applications 104.

WMI module 106 shown in FIG. 1 represents the managed node layer of the WMI module. As discussed below, the WMI module 106 may also include a central store layer, which may include user interface functionality. The different layers of WMI module 106 manage different types of activities and/or perform different types of functions.

Event providers 110 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application that manages multiple storage devices in an enterprise. The application may request to receive events generated by any of the disk drives or other storage devices in the enterprise. The application can use this event information to distribute storage tasks among the multiple storage devices based on the available capacity of each device and/or the quantity of read or write requests received by each storage device.

Figure 2:
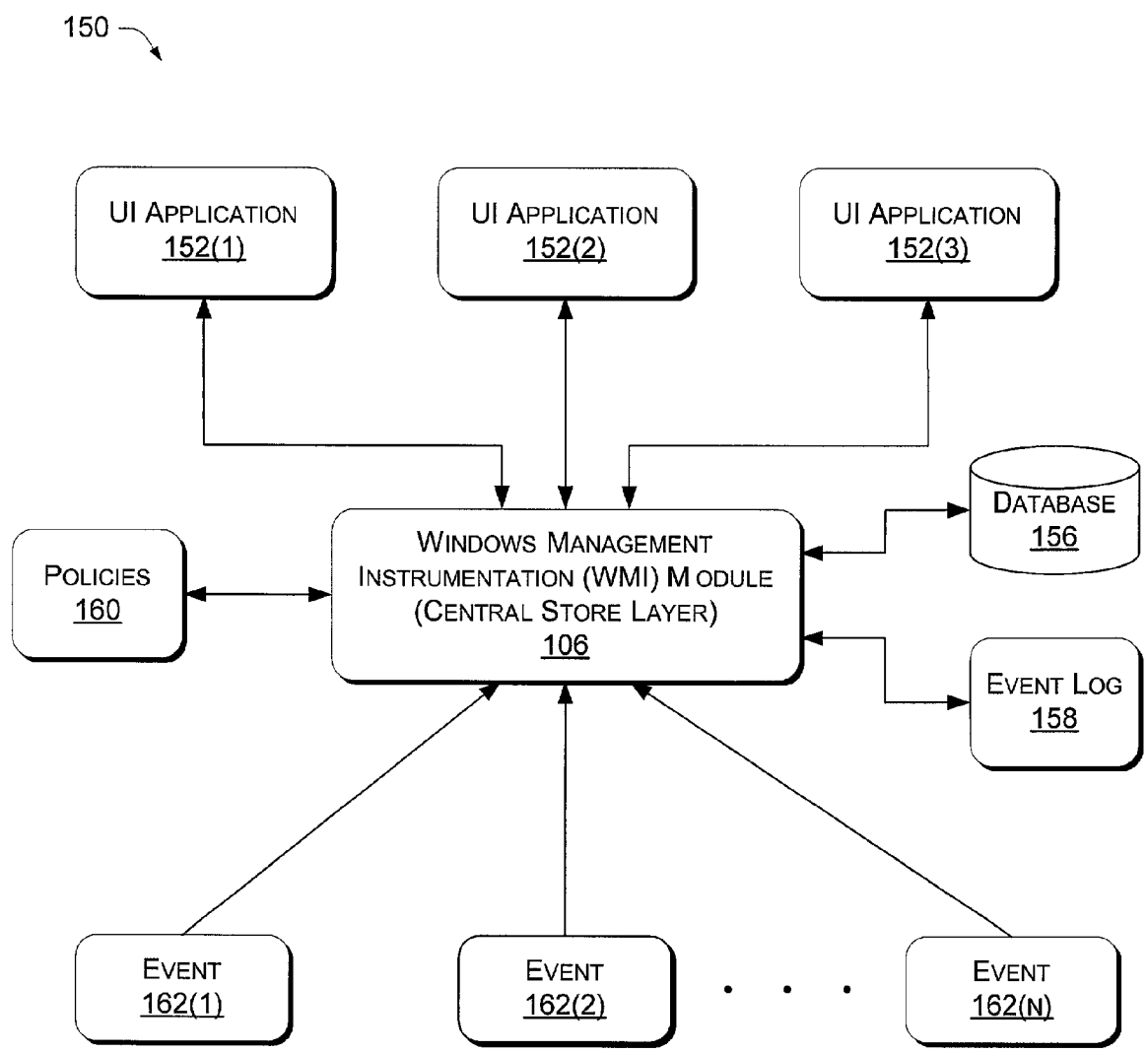
FIG. 2 illustrates a block diagram of a system that receives events and logs those events to an event log.

FIG. 2 illustrates a block diagram of a system 150 that receives events and logs those events to an event log. System 150 includes a central store layer of WMI module 106, which is coupled to multiple user interface (UI) applications 152. UI applications 152 are used to access WMI module 106 to retrieve data, manage systems, and configure various enterprise management parameters. The central store layer of WMI module 106 provides for the centralized logging and storage of event data received from various nodes and various networks in an enterprise. WMI module 106 is also coupled to receive events 162 from one or more event sources. For example, events may be received from the managed node layer of WMI module 106, discussed above with respect to FIG. 1, from an event forwarding application (e.g., application 104), or from one or more event providers (e.g., event provider 110).

System 150 also includes a set of policies 160, which are accessible by WMI module 106. Policies 160 may control the configuration of one or more systems in the enterprise. Other policies may define various activities, such as event filtering, event correlation, and the forwarding of events to particular devices or applications. A database 156 is coupled to WMI module 106. Database 156 stores various information related to the enterprise. For example, database 156 can store event data (i.e., creating an event log), policy data, and enterprise configuration information.

WMI module 106 is also coupled to an event log 158. The event log 158 uses WMI features to provide a distributed architecture that is capable of selecting, filtering, correlating, forwarding, storing, and delivering event data in an enterprise. The event log 158 allows users, such as administrators, to request data related to a particular event, request data from a particular node or device in the enterprise, define the manner in which events are correlated with one another, define how certain events should be forwarded, and define how to store event data. Data requests may be accessed from the event log 158 using, for example, a particular UI application 152. The event log 158 uses an event provider model that allows an application, device or driver to generate events.

The event log 158 provides a policy-based administration of the enterprise. The policy infrastructure allows administrators to set a policy in the Directory Service (DS) and the event log ensures that the proper set of WMI objects (e.g., filters, bindings, correlators, consumers, and configuration objects) are delivered to the proper devices or applications in the enterprise.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
|---|---|
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Event Log Provider | Allows the reading of Windows NT event log entries, controls the configuration of event log administrative options, and event log backup. |
| Registry Provider | Allows registry keys to be created, read, and written. WMI events can be generated when specified Registry keys are modified. |
| Performance Counter Provider | Exposes the raw performance counter information used to compute various performance values. |
| Active Directory Provider | Acts as a gateway to information stored in Microsoft Active Directory services. Allows information from both WMI and Active Directory to be accessed using a single API. |
| Windows Installer Provider | Supplies information about applications installed with the Windows Installer. |
| SNMP Provider | Acts as a gateway to systems and devices that use SNMP for management. Allows SNMP traps to be automatically mapped to WMI events. |

Figure 3:
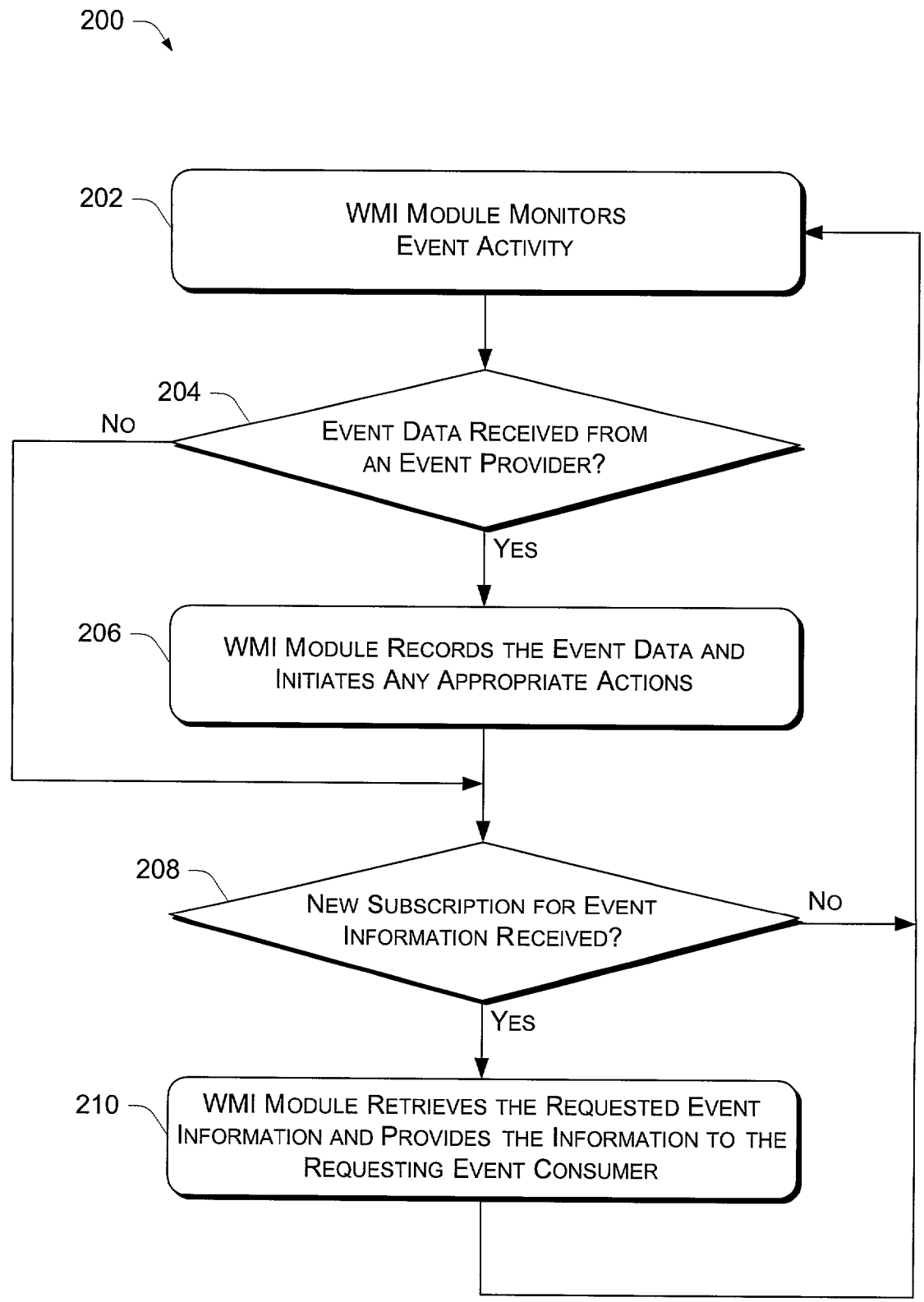
FIG. 3 is a flow diagram illustrating an event-handling procedure.

FIG. 3 is a flow diagram illustrating an event-handling procedure 200. The WMI module monitors event activity throughout the enterprise (block 202). The procedure 200 determines whether event data has been received from an event provider (block 204). If event data has been received, the WMI module records the event data and initiates any appropriate actions (block 206). An appropriate action includes notifying an event consumer of the event (e.g., if the event consumer previously subscribed to such an event).

At block 208, the procedure 200 determines whether a new subscription for event information has been received. The procedure 200 may also determine whether a request to revise an existing subscription has been received. If a new subscription (or a revised subscription) is received, the procedure continues to block 210 where the WMI module retrieves the requested event information and provides the information to the requesting event customer. Alternatively, the procedure may log the subscription request and notify the requesting event consumer when the next event is received that qualifies under the consumer's subscription request.

The WMI module allows multiple systems in an enterprise to be grouped together such that various event policies are assigned to the group of systems, rather than assigning the same set of policies to each individual system. This grouping of systems simplifies the administrative task of assigning event policies to systems within the enterprise.

Figure 4:
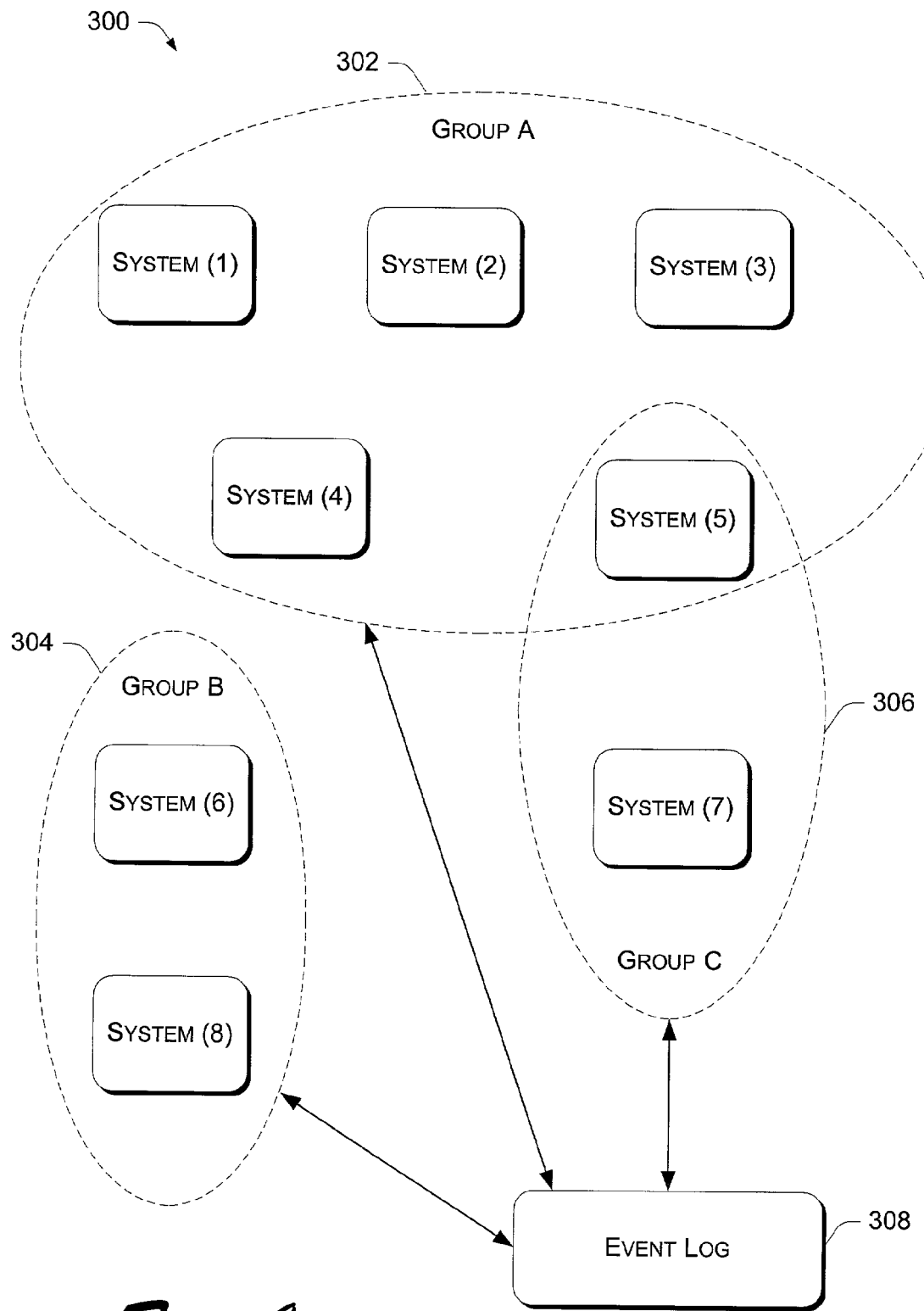
FIG. 4 illustrates an environment in which multiple systems are arranged into three different groupings, all of which are coupled to an event log.

FIG. 4 illustrates an environment 300 in which multiple systems are arranged into three different groupings, all of which are coupled to an event log. The grouping of systems is rule-based depending both on the organization of the enterprise and the properties of the various systems in the enterprise. Additionally, the grouping of systems may be based on the current state and configuration of the systems in the enterprise. Example groups may include all computer systems running a particular version of an operating system, all systems located in a particular geographic region (e.g., Europe), and all systems that have more than 500 Megabytes of free disk space.

The rule-based grouping of systems simplifies the administrative tasks by not requiring the manual maintenance of lists identifying the current configuration and current state of each system in the enterprise. The current state of each system is evaluated before each policy is applied, thereby reducing the likelihood that previously determined state information is no longer valid. As systems enter and leave the enterprise or change configuration, the correct policies are applied to the systems regardless of these ongoing changes to the enterprise.

Environment 300 in FIG. 4 includes three separate groupings 302, 304, and 306. Each grouping 302–306 is coupled to event log 308, which maintains and evaluates the state and configuration information of the systems in environment 300. Group 302 includes five systems, group 304 includes two systems, and group 306 includes two systems, one of which is also included in group 302. Thus, a particular system may be located in two or more groups.

As mentioned above, the grouping of systems is used to simplify the assignment of policies by assigning similar policies to the group instead of assigning the same policies to each individual system. Additionally, this grouping of systems simplifies the management of the system by allowing the administrator to work with fewer groups instead of a larger number of individual systems, many of which have redundant policies.

Figure 5:
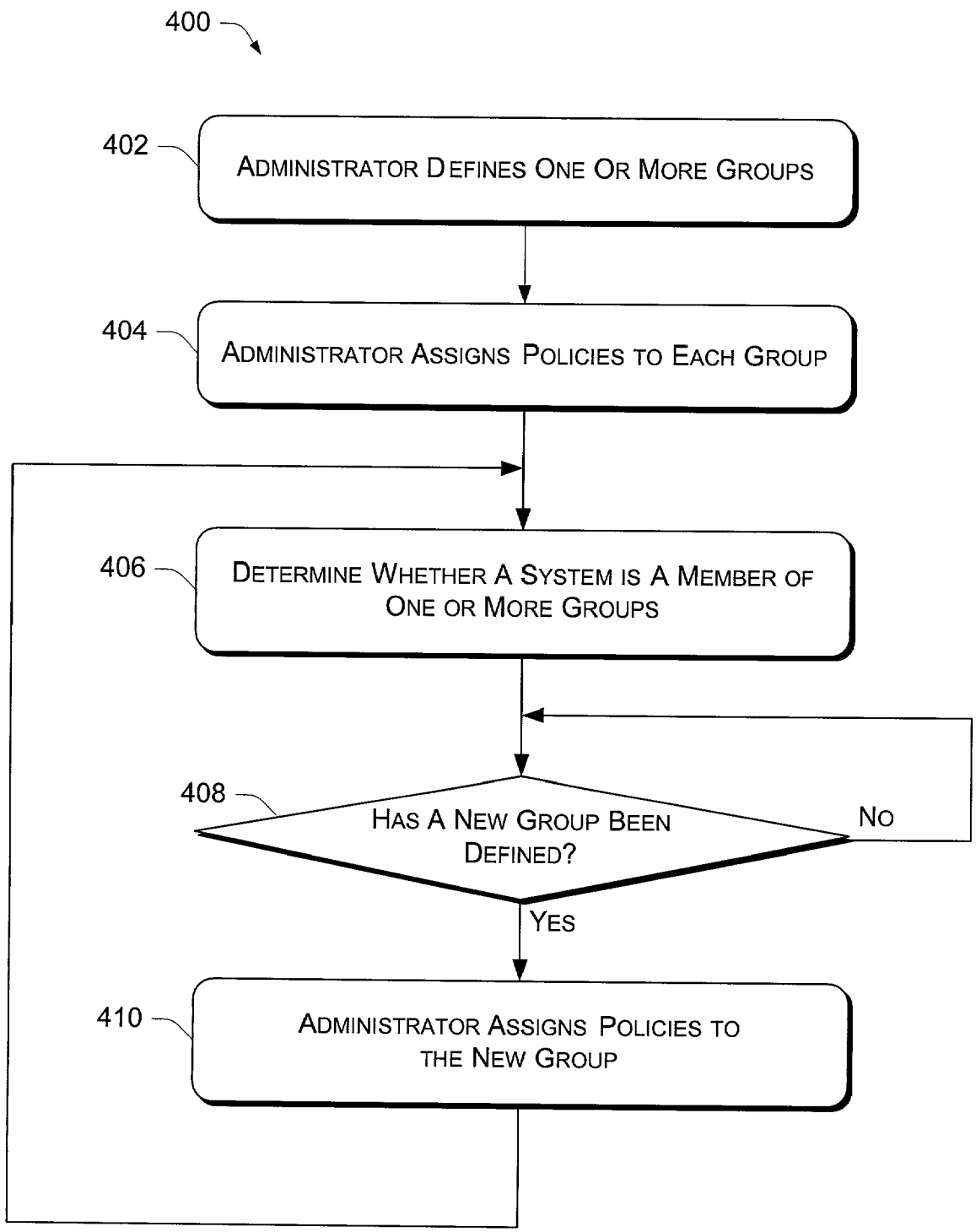
FIG. 5 is a flow diagram illustrating a procedure for establishing and managing groupings of computer systems.

FIG. 5 is a flow diagram illustrating a procedure 400 for establishing and managing groupings of computer systems. Initially, the administrator of the enterprise (or a portion of the enterprise) defines one or more groups (block 402). Next, the administrator assigns policies to each defined group (block 404). Each system in the group becomes associated with the assigned policies, in the same manner as if the policies were separately assigned to each of the individual systems. Block 406 determines whether a particular system is a member of one or more groups. In one implementation, this determination is performed at policy-evaluation time (i.e., when policies are applied to one or more systems in the enterprise). A particular system may be a member of a group at one instance, but not a member of the same group at a different time. For example, if a group includes all systems that have a modem installed, a system that was previously a member of the group will not be a member if the modem is removed from the system. Since the group membership is determined at policy-evaluation time, a particular system may be removed from a group without any action on the part of the administrator or other user.

At block 408, the procedure 400 determines whether a new group has been defined. If a new group has been defined, then the administrator assigns policies to the new group (block 410). The procedure then returns to block 406 to determine whether a particular system is a member of the new group as well as other existing groups. Administrators (or other users) may generate new policies and apply those new policies to particular systems and/or groups of systems. New policies that are applied to a group are automatically applied to all systems in the group.

In a particular embodiment, systems in an enterprise are grouped according to the department or organization division with which they are associated. For example, one group of systems may be associated with the production department, another group associated with the marketing department, and a third group associated with the customer service department. Each department may have different needs with respect to their policies, but the systems within a particular department are likely to have many policies in common. For example, an accounting department may have stricter security requirements and, therefore, require a different set of policies.

Figure 6:
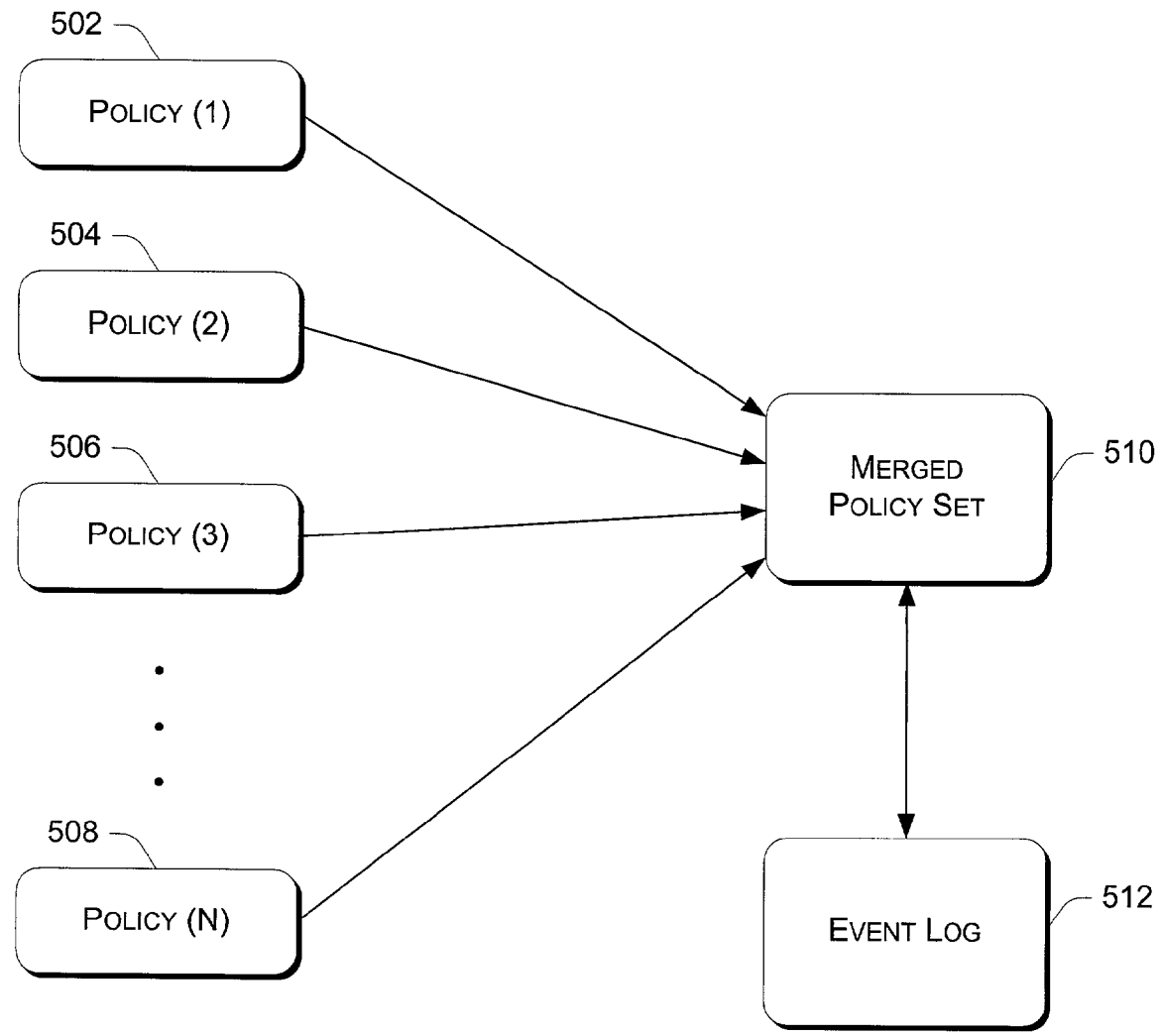
FIG. 6 illustrates the combining of multiple policies into a single merged policy set.

FIG. 6 illustrates the combining of multiple policies 502, 504, 506, and 508 into a single merged policy set 510. Event log 512 communicates with the merged policy set 510. This merging of policies allows several policies to be merged together into a single policy. In a particular implementation, policies are applied by administrators and stored in a central location. The appropriate policies for a particular system are selected, ordered, merged and applied by the WMI module. When the policy is applied, the desired event filters and bindings are created at the appropriate systems throughout the enterprise.

The policy elements that are complementary with one another are appended to the new, merged policy set 510. If two or more policy elements are in conflict with one another, then the conflict is resolved by applying a conflict-resolution algorithm, discussed below.

Figure 7:
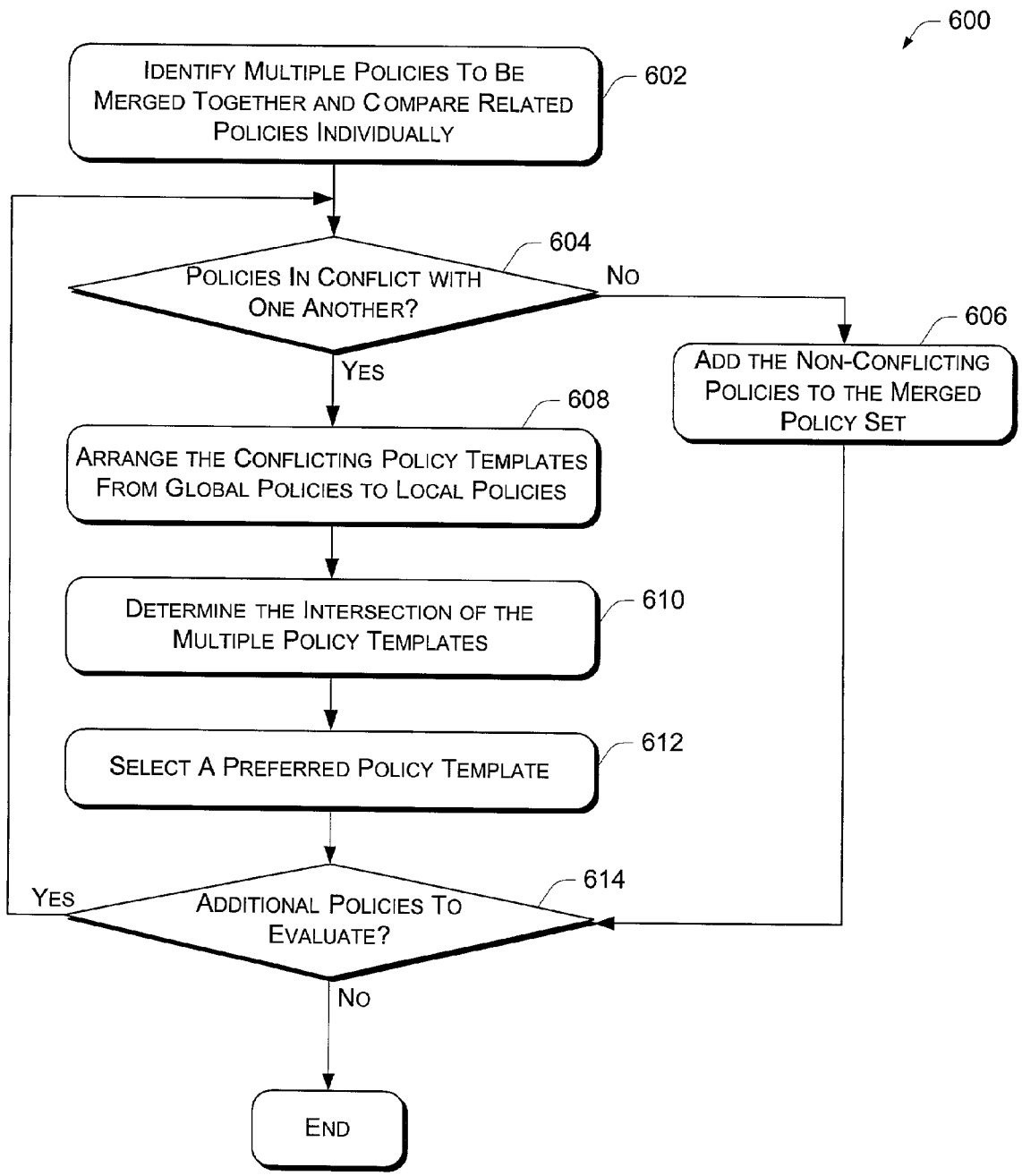
FIG. 7 is a flow diagram illustrating a procedure for generating a merged policy set from multiple policies.

FIG. 7 is a flow diagram illustrating a procedure 600 for generating a merged policy set from multiple policies. Initially, the procedure 600 identifies multiple policies to be merged together and compares related policies individually (block 602). Next, the procedure determines whether the policies being compared are in conflict with one another (block 604). If the policies are not in conflict with one another, the non-conflicting policies are added to the merged policy set (block 606). However, if the policies are conflicting, the procedure continues to block 608 where the conflicting policy templates are arranged in order from global policies to local policies. The procedure 600 then determines the intersection of the multiple policy templates (block 610) and selects a preferred policy template (block 612). If additional policies remain to be evaluated, the procedure returns to block 604. Otherwise, the procedure ends after evaluating all policies.

Figure 8:
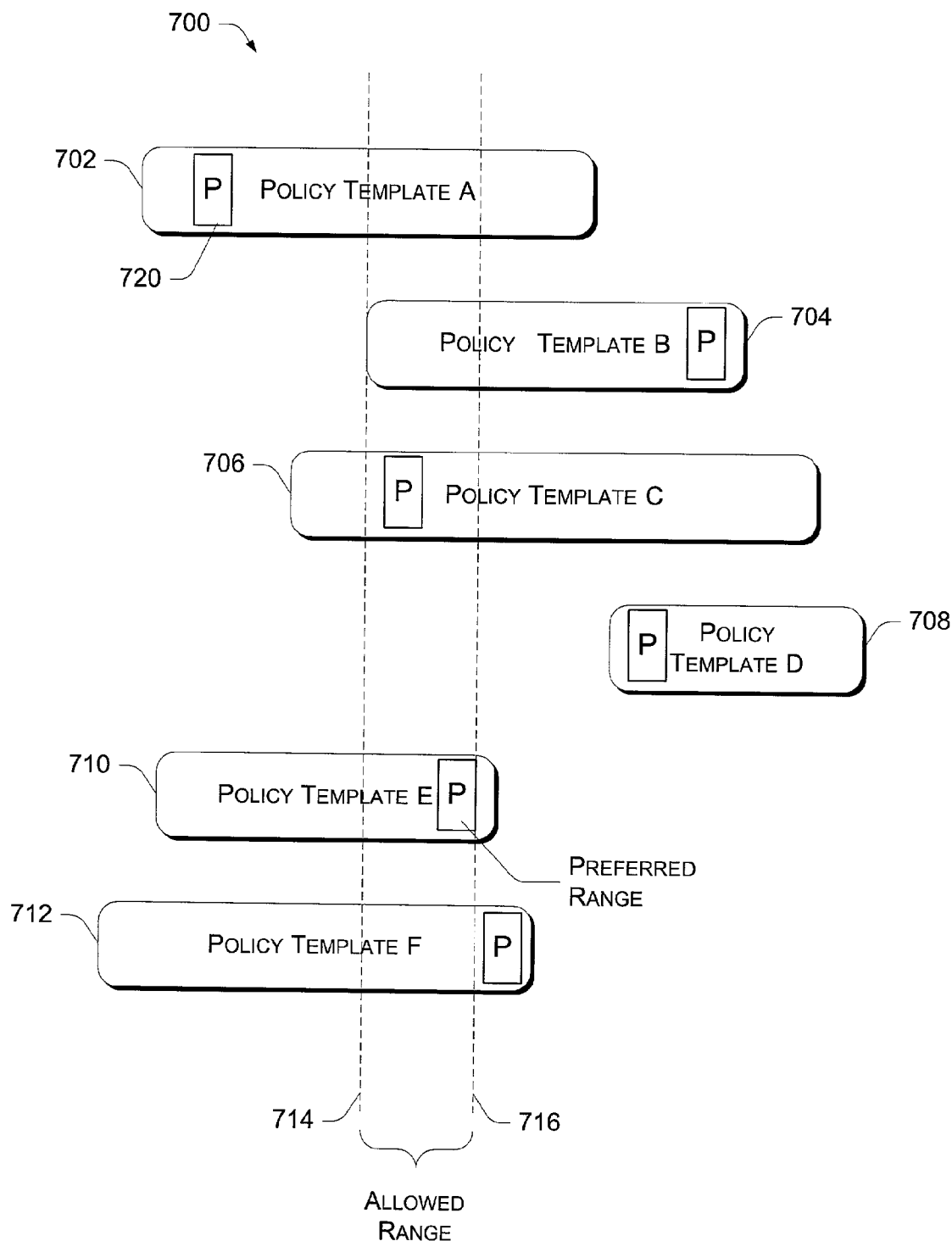
FIG. 8 illustrates an arrangement of multiple policy templates having partially overlapping policy elements.

FIG. 8 illustrates an arrangement 700 of multiple policy templates having partially overlapping policy elements. Each policy template includes multiple properties. One property represents an "allowable range" for the policy and another property represents a "preferred value" for the policy. These property values will affect the outcome of the application of the policy, which, in turn, causes the creation of event filters, bindings, and other activities to apply the policy throughout the enterprise.

The arrangement 700 is used to eliminate conflicts between multiple policies being merged into a single policy set. As mentioned above with respect to block 608 in FIG. 7, the policy templates are arranged from global policy templates (e.g., policies that define the broad configuration and operation objectives for the entire enterprise) at the top of FIG. 8 to local policy templates (e.g., policies that are specific to a particular device or application) at the bottom of FIG. 8. For example, a global policy template 702 may be created or defined by one or more administrators that are responsible for administering the entire enterprise. A local policy template 712 may be created or defined by an administrator that is responsible for a particular portion of an enterprise, such as a particular group of systems or systems in a specific location. Additional policy templates 704, 706, 708, and 710 each contain varying levels of policies ranging from nearly global policies (policy template 704) to nearly local policies (policy template 710).

After the policy templates are arranged as shown in FIG. 8, it is necessary to find the intersection of all policy templates. In the example of FIG. 8, the intersection of five of the policy templates is shown by the two broken lines 714 and 716. This intersection of five policy templates defines an "allowed range" that satisfies the majority of policy templates. Note that policy template 708 is discarded because the policies are in conflict with (e.g., opposed to) the policy range defined by the intersection of the other five policy templates 702, 704, 706, 710, and 712. Within each policy template 702, 704, 706, 708, 710 and 712, is a preferred range or preferred value 720 (identified by a "P" surrounded by a box) associated with the policy template.

Finally, a "preferred range" is selected. The preferred range (or preferred policy) has all properties set to preferred properties. Each preferred property is a preferred policy from the policy closest to the system (i.e., the bottom of FIG. 8) and still within the "allowed range". In the example of FIG. 8, the preferred range for the merged policy template is the preferred range associated with policy template 710, because it is the preferred range closest to the system that is also within the allowed range. The preferred range associated with policy template 712 is not selected because that preferred range is not within the allowed range.

The conflict resolution procedure discussed above achieves customization of the policies on a particular system based on the preferences of the administrator closest to the system (i.e., the administrator most knowledgeable about the system and responsible for the system) while staying within the policy ranges dictated by all administrators with a higher level of authority.

The following are example policy templates:
Policy template 1:
Policy type: policy forwarding
Destination range: Sys-red, Sys-blue, Sys-green
Destination preferred: Sys-blue
Policy template 2:
Policy type: policy forwarding
Destination range: Sys-red, Sys-blue
Destination preferred: Sys-red In this example, Policy template 1 is set at a global level and Policy template 2 is set at a local level. When the two policy templates are merged, the resulting merged template is:
Policy template Merged:
Policy type: policy forwarding
Destination range: Sys-red, Sys-blue, Sys-green
Destination preferred: Sys-red Thus, the preferred range or value is selected from the lowest (most local) possible level. In this case, the preferred range of the merged policy template is the preferred range of the local policy template (Sys-red).

FIG. 9 illustrates an example of a suitable operating environment in which the event handling mechanism described herein may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 9 shows a general example of a computer 842 that can be used in accordance with the invention. Computer 842 is shown as an example of a computer that can perform the various functions described herein. Computer 842 includes one or more processors or processing units 844, a system memory 846, and a bus 848 that couples various system components including the system memory 846 to processors 844.

The bus 848 represents one or more of any of several types of bus structures, including a memory bus or memory controller, a peripheral bus, an accelerated graphics port, and a processor or local bus using any of a variety of bus architectures. The system memory 846 includes read only memory (ROM) 850 and random access memory (RAM) 852. A basic input/output system (BIOS) 854, containing the basic routines that help to transfer information between elements within computer 842, such as during start-up, is stored in ROM 850. Computer 842 further includes a hard disk drive 856 for reading from and writing to a hard disk, not shown, connected to bus 848 via a hard disk drive interface 857 (e.g., a SCSI, ATA, or other type of interface); a magnetic disk drive 858 for reading from and writing to a removable magnetic disk 860, connected to bus 848 via a magnetic disk drive interface 861; and an optical disk drive 862 for reading from and/or writing to a removable optical disk 864 such as a CD ROM, DVD, or other optical media, connected to bus 848 via an optical drive interface 865. The drives and their associated computer-readable media provide nonvolatile storage of computer readable instructions, data structures, program modules and other data for computer 842. Although the exemplary environment described herein employs a hard disk, a removable magnetic disk 860 and a removable optical disk 864, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 860, optical disk 864, ROM 850, or RAM 852, including an operating system 870, one or more application programs 872, other program modules 874, and program data 876. A user may enter commands and information into computer 842 through input devices such as keyboard 878 and pointing device 880. Other input devices (not shown) may include a microphone, joystick, game pad, satellite dish, scanner, or the like. These and other input devices are connected to the processing unit 844 through an interface 868 that is coupled to the system bus (e.g., a serial port interface, a parallel port interface, a universal serial bus (USB) interface, etc.). A monitor 884 or other type of display device is also connected to the system bus 848 via an interface, such as a video adapter 886. In addition to the monitor, personal computers typically include other peripheral output devices (not shown) such as speakers and printers.

Computer 842 operates in a networked environment using logical connections to one or more remote computers, such as a remote computer 888. The remote computer 888 may be another personal computer, a server, a router, a network PC, a peer device or other common network node, and typically includes many or all of the elements described above relative to computer 842, although only a memory storage device 890 has been illustrated in FIG. 9. The logical connections depicted in FIG. 9 include a local area network (LAN) 892 and a wide area network (WAN) 894. Such networking environments are commonplace in offices, enterprise-wide computer networks, intranets, and the Internet. In certain embodiments, computer 842 executes an Internet Web browser program (which may optionally be integrated into the operating system 870) such as the "Internet Explorer" Web browser manufactured and distributed by Microsoft Corporation of Redmond, Wash.

When used in a LAN networking environment, computer 842 is connected to the local network 892 through a network interface or adapter 896. When used in a WAN networking environment, computer 842 typically includes a modem 898 or other means for establishing communications over the wide area network 894, such as the Internet. The modem 898, which may be internal or external, is connected to the system bus 848 via a serial port interface 868. In a networked environment, program modules depicted relative to the personal computer 842, or portions thereof, may be stored in the remote memory storage device. It will be appreciated that the network connections shown are exemplary and other means of establishing a communications link between the computers may be used.

Computer 842 typically includes at least some form of computer readable media. Computer readable media can be any available media that can be accessed by computer 842. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 842. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
   identifying multiple policy templates be combined together; determining whether any conflicts exist between the multiple policy templates;
   adding non-conflicting policy templates to a merged policy set;
   resolving conflicting policy templates by:
      arranging conflicting policy templates in relative order from most global policy templates to most local policy templates;
      determining an intersection of the conflicting policy templates, effective that a majority of the conflicting policy templates fall at least partially within the intersection;
      identifying a preferred value within each of the conflicting policy templates;
      comparing individual conflicting policy templates to one another;
      selecting a preferred individual one of the conflicting policy templates that is relatively more local and that has its preferred value within the intersection; and,
      adding the preferred individual one of the conflicting policy templates to the merged policy set.

2. A method as recited in claim 1 wherein the preferred policy represents a preferred range of values associated with at least one of the multiple policies.

3. A method as recited in claim 1 further comprising determining an allowed range of values associated with the multiple policies.

4. A method as recited in claim 1 wherein the preferred policy is contained within the allowed range of values associated with the multiple policies.

5. A method as recited in claim 1 further comprising deleting policies that are outside the allowed range of values, wherein the allowed range of values is associated with the multiple policies.

6. A method as recited in claim 1 wherein selecting a preferred policy includes
   selecting the preferred policy template based on the policy template closest to the local policies and within the intersection of the conflicting policy templates.

7. A method as recited in claim 1 wherein the policies are event-handling policies.

8. A method as recited in claim 1 wherein the policies define how a device is to be configured.

9. A method as recited in claim 1 wherein the policies identify the types of events that are provided to each device.

10. A method as recited in claim 1 wherein resolving conflicting policies includes comparing related policies individually.

11. A method as recited in claim 1 wherein the method is implemented by a management module.

12. One or more computer-readable memories containing a computer program that is executable by a processor to perform the method recited in claim 1.

13. A computer-implemented method comprising:
    identifying multiple policies to be combined together;
    determining whether any conflicts exist between the multiple policies;
    adding non-conflicting policies to a merged policy set;
    arranging conflicting policies from global policies to local policies, the arranging act creating a listing that includes a global policy at one end and a local policy at another end;
    determining an intersection of the conflicting policies, at least a plurality of the conflicting policies falling at least partially within the intersection; and
    selecting a preferred policy based on the policy closest to the local policies and within the intersection of the conflicting policies.

14. A method as recited in claim 13 wherein the preferred policy represents a preferred range of values associated with at least one of the multiple policies.

15. A method as recited in claim 14 further comprising deleting policies that are outside the preferred range of values.

16. A method as recited in claim 13 wherein the policies are event-handling policies.

17. A method as recited in claim 13 wherein the policies determine how an associated device is configured.

18. One or more computer-readable memories containing a computer program that is executable by a processor to perform the method recited in claim 13.

19. An apparatus comprising:
    a storage device configured to store a merged policy set; and
    a management module coupled to the storage device and configured to identify multiple policies to be merged into the merged policy set, wherein the management module adds non-conflicting policies to the merged policy set and resolves conflicts among conflicting policies by selecting a preferred policy based on an allowed range of policy values,
    wherein resolving conflicts among conflicting policies includes arranging conflicting policy templates in order from global policies to local policies, the arranging act creating a listing that includes a global policy template at one end and a local policy template at another end, determining the intersection of the conflicting policy templates, at least a plurality of the conflicting policy templates falling at least partially within the intersection, and selecting the preferred policy template based on the policy template that is closest to the local policies and within the intersection of the conflicting policy templates.

20. An apparatus as recited in claim 19 wherein the management module is part of an enterprise computing system.

21. An apparatus as recited in claim 19 wherein the management module receives event data generated by a plurality of event providers coupled to the management module.

22. An apparatus as recited in claim 19 wherein the multiple policies define how devices are configured in an enterprise.

23. An apparatus as recited in claim 19 wherein the multiple policies identify the types of events that are provided to each device in an enterprise.

* * * * *